May 12, 1953 W. BEVERIDGE 2,638,009
QUICKLY-DEMOUNTABLE CHAIN
Filed Jan. 22, 1951
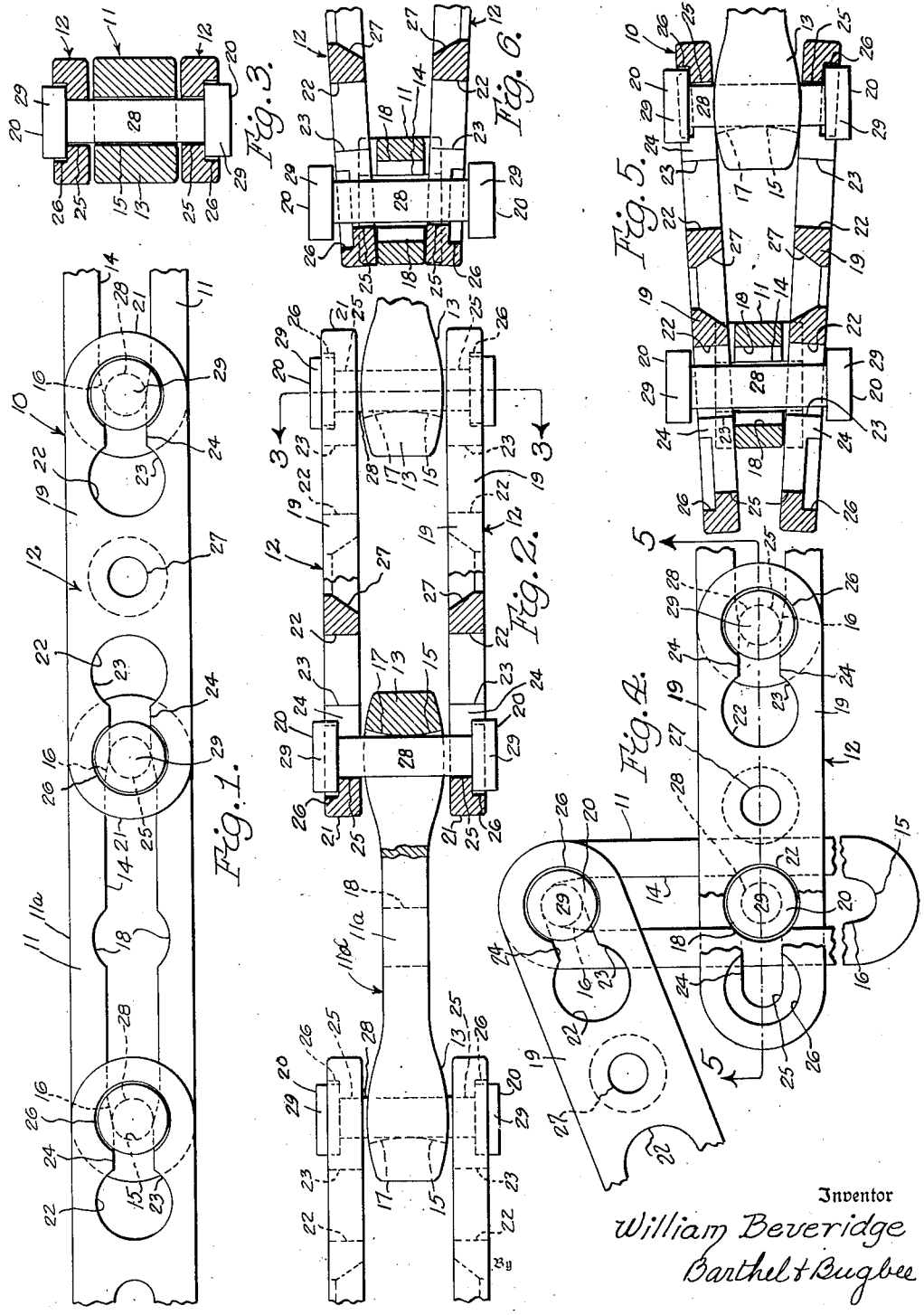
Inventor
William Beveridge
Barthel & Bugbee
Attorneys Patented May 12, 1953

UNITED STATES PATENT OFFICE 2,638,009

2,638,009

QUICKLY-DEMOUNTABLE CHAIN

William Beveridge, Detroit, Mich.

Application January 22, 1951, Serial No. 207,211

3 Claims. (Cl. 74—254)

This invention relates to chains and, in particular, to demountable drive or conveyor chains.

One object of this invention is to provide a drive or conveyor chain wherein the links may be easily connected to or disconnected from one another at any point so as to facilitate assembly or disassembly of the chain or to shorten the chain or to lengthen it.

Another object is to provide a drive or conveyor chain wherein the links cannot become disconnected as long as a moderate tension is maintained in the chain, but can be easily separated by the user when the chain is in a slack condition.

Another object is to provide a drive or conveyor chain of the foregoing character wherein the side links are produced by stamping operations and the pivot pins by automatic screw machine operations, these operations being quicker and less expensive than the previously cast or forged links or pivot pins of prior drive or conveyor chains.

Another object is to provide a drive or conveyor chain of the foregoing character wherein the pivot pins have circular heads and are therefore rotatable during use, this rotation distributing the wear around the circumference of the pin rather than concentrating the wear in a single location, as in prior pivot pins with non-circular heads.

In the drawings:

Figure 1 is a side elevation of a portion of a drive or conveyor chain, according to the present invention;

Figure 2 is a top plan view, partly in horizontal section, of the chain shown in Figure 1;

Figure 3 is a vertical cross-section taken along the line 3—3 in Figure 2;

Figure 4 is a side elevation, partly broken away, of the chain shown in Figure 1, showing the chain in one stage of assembly or disassembly;

Figure 5 is a horizontal section taken along the line 5—5 in Figure 4; and

Figure 6 is a fragmentary horizontal section of a portion of a link of the chain shown in Figure 1, showing the chain in another stage of assembly or disassembly.

Referring to the drawings in detail, Figures 1 and 2 show a portion of a quickly demountable drive or conveyor chain, generally designated 10, according to one form of the invention and including center links and side links, generally designated 11 and 12 respectively. Each of the center links 11 consists of a single elongated member, the ends 13 of which are enlarged or increased in thickness (Figure 2). Formed in each of the center links 11, and extending through most of its length, is an elongated slot 14, the rounded end portions 15 of which are narrowed as at 16 (Figure 1). The end walls of the slot 14 are also convexly rounded as at 17 to accommodate any moderate transverse bending of the chain. The side surfaces of the center link ends 13 adjacent the outer ends or junctions of the hole portions 15 with said side surfaces (Figures 2 and 5) are rounded so that they are inclined or tapered away from said outer ends or junctions to facilitate lateral tilting of the side links 12 relatively to the center links 11 during assembly or disassembly of said chain 10, as shown in Figure 5 and described more fully below in connection with the operation of the invention. Midway between its ends 13, the slot 14 is provided with a rounded wide portion or enlargement 18 in the thin central portion 11a of the link 11.

Alternately located with respect to the center links 11 and interconnecting them are the side links 12 consisting of two elongated flat members having mid-portions or central portions 19, the ends of the side links 12 being pivotally secured to the ends 13 of the adjacent center links 11 by pivot elements or pins 20. It is understood, however, that a modified chain consisting of three or more side links 12 pivotally secured at each end to two or more center links 11 in alternate arrangement on a longer pivot pin 20 may also be used, if desired.

Each of the flat members or side links 12 is provided near either end 21 with a keyhole-shaped opening 22 consisting of a round opening 23 communicating with an opening extension or slot 24 which in turn has a rounded end portion 25 located beneath a shallow countersunk portion or socket 26 of approximately the same diameter as the round opening 23.

In its mid-portion 19 and midway between its ends 21, each of the flat members or side links 12 is provided with a flared countersunk hole 27 to permit attachment of rollers, trolley arms and other devices (not shown) to any of the side links 12 along the chain 10.

Each of the pivot pins 20 consists of a cylindrical shank 28 having at either end a flat circular head 29, the diameter of which is slightly less than that of the countersunk portion 26 and the round opening 23 of the flat members 19. In the assembled chain 10, each end 21 of one of the two side links 12 is pivotally secured to the near end 13 of one of the adjacent links 11 by one of the pins 20. The heads 29 of each pin 20 fit into the countersunk portions or sockets 26 of the flat members 19 and the shank 28 of each pin 20 passes through the rounded end portions 25 of the opening extensions 24 and the rounded end portions 15 of the slot 14 of the adjacent link 11 (Figures 2 and 3).

In the assembly of the chain 10 described above, the user passes one head 29 of a pin 20 through the rounded wide central portion 18 of the slot 14 in a center link 11. A flat member or side link 12 is then held at right angles to the center link 11, and placed over the head 29 of the pin 20 so that the said head 29 passes up through the round opening 23 of the keyhole-shaped opening 22 (Figure 4). The same is done with another side link 12 over the other head 29 of the pin 20 on the opposite sides of the center link 11, both flat members 19 having those sides with the countersunk portion 26 facing outward, away from the center link 11. The two side links 12 are then brought as close to each other as possible, separated only by the thin central part of the center link 11, and the pin 20 is adjusted so that both of its heads 29 clear the rounded openings 23 through which they have been passed (Figure 5).

The pin 20 and the center link 11 through which it passes are then slid laterally toward the nearer ends 21 of the flat members 19, the shank 28 of the pin passing along the opening extension or slot 24 of the keyhole-shaped opening 22 in each of the said flat members and stopping in the rounded end portions 25 thereof (Figure 6). The heads 29 of the pin 20 are now directly over the countersunk portions 26 of the keyhole-shaped openings 22. The link 11 is then moved across the flat members 19 in a direction perpendicular to the parallel flat members 19. The middle part of the shank 28 passes along the slot 14 in the center link 11 until the flat members 19 are pushed farther apart as one enlarged or thickened end 13 of the link approaches them.

As the side links 12 move away from each other, the heads 29 are received and held in the countersunk portions 26 of the keyhole-shaped openings 22 of the side links. When the shank 28 of the pin 20 reaches the rounded end portion 15 of the slot 14 in the link 11, the thick end 13 of the link has been reached, the side links 12 have been pushed as far apart as possible, being prevented from separating further by the heads 29 of the pin 20 and pivotally secured to the link 11 by the said pin, and the heads 29 are fully seated in the countersunk portions 26. The center link 11 is then swung into longitudinal alignment with the side links 12 to prevent accidental disassembly of the chain 10 (Figures 1, 2 and 3).

The process described above is then repeated for the further ends of the center link 11 and the side links 12 in combination with other side links 12 and center links 11 in the chain 10, which are similarly assembled.

To disassemble the chain, the foregoing procedure is reversed after the chain has been loosened to permit manipulation of the links. The center link 11 is swung perpendicular to the side links 12 to permit it to be shoved through the side links 12 (Figure 4) so that the thick end 13 of the link is moved out from between the flat side links 12 until only the thin center part of the center link 11 separates the side links 12, which are brought close together to enable the heads 29 of the pin 20 to become disengaged from the countersunk portions 26 of the keyhole-shaped openings 22 (Figure 6). The pin 20 is then moved along the opening extensions 24 and into the round openings 23 (Figure 5) through which the heads 29 of this pin may be withdrawn as the side links 12 are freed therefrom. The pin 20 may then be freed from the center link 11 by being withdrawn through the rounded wide portion 18 of the slot 14. This, of course, is repeated in the disassembly of the other links of the chain.

The chain 10 of the present invention can thus be disassembled when in a slack condition, but the links cannot become separated as long as a moderate tension is provided. Moreover, since the pivot pins 20 have circular heads 29, these pins can rotate while the chain is in use, thereby distributing the wear around the circumference of the pin rather than concentrating it in a single location, as has been the case with prior pivot pins having T-heads or other non-circular heads preventing them from rotation.

What I claim is:

1. A quickly-demountable chain comprising elongated laterally-spaced side links, transverse pivot elements pivotally mounted in said side links at opposite ends thereof, and center links with enlarged end portions and narrowed intermediate portions pivotally interconnecting said pivot elements in alternating sequence with said side links, said center links having elongated holes adapted to slidably receive said pivot elements, said pivot elements having constricted shanks with enlarged heads at the opposite ends thereof, and said side links having elongated openings therein adapted to receive said pivot elements, the side surfaces of said enlarged end portions of certain of said center links adjacent the outer ends of said hole being inclined away from said outer ends of said hole whereby to facilitate lateral tilting of said side links relatively to said center links.

2. A quickly-demountable chain comprising elongated laterally-spaced side links, transverse pivot elements pivotally mounted in said side links at opposite ends thereof, and center links with enlarged end portions and narrowed intermediate portions pivotally interconnecting said pivot elements in alternating sequence with said side links, said center links having elongated holes adapted to slidably receive said pivot elements, said pivot elements having constricted shanks with enlarged heads at the opposite ends thereof, and said side links having elongated openings therein adapted to receive said pivot elements, the outer ends of said elongated holes in certain of said center links being of arcuate cross-section in a plane passing through the axis of the pivot element engaging said hole whereby to permit swinging of said center links in a plane lateral to said chain.

3. A quickly-demountable chain comprising elongated laterally-spaced side links, transverse pivot elements pivotally mounted in said side links at opposite ends thereof, and center links with enlarged end portions and narrowed intermediate portions pivotally interconnecting said pivot elements in alternating sequence with said side links, said center links having elongated holes adapted to slidably receive said pivot elements, said pivot elements having constricted shanks with enlarged heads at the opposite ends thereof, and said side links having elongated openings therein adapted to receive said pivot elements, the side surfaces of said enlarged end portions of said center links adjacent the outer ends of said holes being inclined away from said outer ends of said holes, said outer ends of said elongated holes in certain of said center links being of arcuate cross-section in a plane passing through the axis of the pivot element engaging said aperture whereby to facilitate lateral tilting of said side links relatively to said center links and permit swinging of said center links in a plane lateral to said chain.

WILLIAM BEVERIDGE.

References Cited in the file of this patent

UNITED STATES PATENTS

| Number | Name | Date |
|--------|------|------|
| 826,991 | Christ | July 24, 1906 |
| 1,326,171 | Berry | Dec. 30, 1919 |
| 1,397,131 | Law | Nov. 15, 1921 |